April 8, 1941.  H. C. THOMPSON ET AL  2,237,718
HOLDER FOR CONDIMENTS AND LIKE SUBSTANCES
Filed Oct. 31, 1939
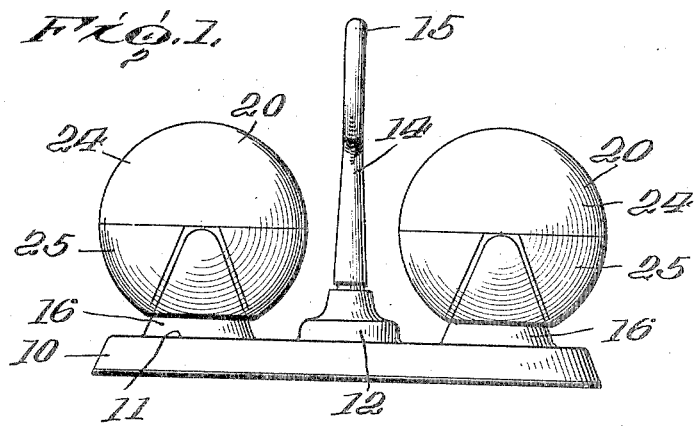
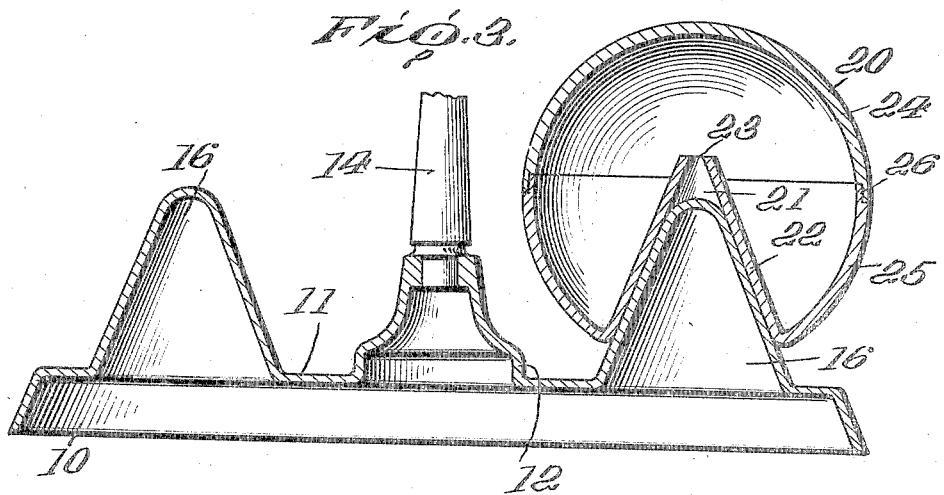
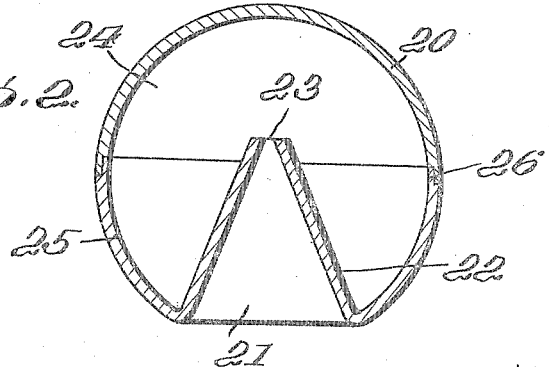
INVENTORS
Henry C. Thompson,
and Angelo De Stefano
Mason & Porter
ATTORNEYS Patented Apr. 8, 1941

2,237,718

UNITED STATES PATENT OFFICE 2,237,718

HOLDER FOR CONDIMENTS AND LIKE SUBSTANCES

Henry C. Thompson and Angelo De Stefano, Bogota, N. J., assignors to Bergen Plastics, Inc., a corporation of New Jersey Application October 31, 1939, Serial No. 302,242

2 Claims. (Cl. 65—45)

This invention relates to a holder for condiments and like substances, in which the substance is normally contained within a shaker element which can be shaken up and down for the purpose of discharging a small portion of the substance.

One of the features of the present invention is the provision of a light, simple, and compact structure which can be easily cleaned, and from which the condiment or the like is not easily spilled by accident.

Another feature of the invention is the provision of a holder for condiments and like substances in which the condiment is protected against atmospheric moisture so that the holder is especially adapted for the dispensing of table salt or like hygroscopic or semi-hygroscopic substances.

A feature of the preferred form of the invention is the provision of the condiment containers in the form of substantially spherical articles which are only in stable equilibrium in one position; together with a holder which cooperates with the container for sealing the same against the penetration of moisture and for definitely supporting the same, so that the user will normally replace the container upon its support.

With these and other features as objects in view, an illustrative form of construction is shown in the accompanying drawing, in which:

Figure 1 is a side elevation of a structure comprising a salt container and a pepper container which can be individually utilized, in association with a supporting and sealing base.

Figure 2 is an upright diametrical section through a container.

Figure 3 is a corresponding section through the supporting base.

In the drawing, the base is formed with a table portion 10, having a substantially flat upper surface 11. Near the center of length of this table 10 is formed an upwardly extending boss 12 which has an aperture in its top for engaging the pin 13 of a lifting structure 14 which is usually provided at its top with an apertured finger ring 15. The table 10 also has the upwardly extending conical supporting and sealing structures 16 which are spaced from the axis of the lifting structure 14 a sufficient distance to permit the positioning of the condiment containers proper.

The structure as illustrated comprises two condiment containers 20 which are of shaker type, and are illustrated as being identical in shape and design. Each of them comprises a shaker element which for the major portion of its external surface is of spherical form, and which also includes a re-entrant conical recess 21 formed by a conical wall 22 which has its larger end sealed to the external spherical wall of the container 20 and has an opening 23 at its inner end. Preferably, the inner end opening 23 is formed by truncating the conical wall 22 at a plane at right angles to the axis of the cone and located substantially to intersect the center of a sphere.

Although other angles may be employed, it has been found that when the apex angle of the conical projection 16 and of the conical cavity 21 are each substantially 30 degrees, an optimum relationship is obtained for securing a satisfactory sealing while permitting easy disengagement of the parts, and that the engagement of the parts is sufficient for preventing accidental displacement of a container or upsetting of the structure. The larger end of the projection 16 is greater in diameter than the larger end of the conical recess 21, so that the aforesaid engagement occurs while the corresponding container 20 is positioned with its lower portion above the substantially flat area 11 of the base, so that the proper sealing is not hindered by any accidental collection of salt or other material on the base structure, which might prevent the proper sealing or cause fouling of the shaker surfaces.

It is preferred to form both the base structure 10 and also the condiment holders 20 of material which may be formed plastically, such as cellulose compositions of nitrate or acetate type, synthetic resin compositions, etc., although other plastics such as glass may be utilized. In forming the base, it is preferred to construct it of the two parts as shown. The individual containers 20 may be made of a single piece by blowing and forming operations, or may be constructed as shown in Figure 2 of two sections. The upper section 24 may be molded as a hemisphere of a colored and opaque plastic material. It is then preferred to form the lower section 25 with the major portion of its outer surface as a hemisphere, and having the re-entrant conical wall 22 formed integrally therewith during the molding operation, along with the inwardly-offset flange 26. The two sections 24, 25 are then brought together with the inclusion of a proper cement at the overlapping joint, and thus a substantially spherical article is produced which is entirely sealed and closed save for the opening 23. In such molding operations, the several walls may be made of substantially uniform thickness, whereby a light strong structure is produced. The lower section 25 is preferably of a transparent plastic, so that the nature, condition, and quantity of the contents may be observed easily.

In use, either of the containers 20 may be picked up by hand, and by the usual shaking operation in substantially vertical direction, a quantity of the contents may be ejected downwardly through the bottom recess at the end of each downward stroke. The device is therefore especially effective for condiments such as salt, pepper, etc., in granular form.

The container can easily be filled by inverting it and pouring the material into the recess, so that it flows through the opening 23 into the interior of the structure. It will thus be noted that the spacing of the open smaller end of the conical wall, with respect to the spherical surface and the groove, operates to determine the quantity of material which can be conveniently placed in the container 20, even with employment of the normal rocking about horizontal axes during the course of the filling. This determination of the quantity of contents is desirable, in order that the container, when right side up, shall not have its trough so full that discharge occurs through the opening 23, and so that there may be no spilling through this opening if the container is caused to roll on a table surface, etc. For this reason, it is preferred to have the open smaller end of this conical wall substantially at the height of the center of the spherical form, or somewhat above this in the normal position of the container.

It will be noted that the proposed spherical external shape provides a structure which is in stable equilibrium, so to speak, only when it is resting upon the circular edge formed by the junction of the conical wall 22 and the external spherical surface, at which time the table or other support provides at least a partial seal against the free penetration of moisture laden air into the holder. However, the spherical shaping renders even this casual positioning upon the table an obviously uncertain condition of rest, and the user tends to replace the container 20 upon an unoccupied projecting cone 16 of the base structure, wherewith a more definite seal is produced, and the assembly can be stored for long periods of time without danger of excessive penetration of moisture to the salt or other contents of the container 20.

It is obvious that the invention is not restricted to the form shown, but that it may be modified in many ways within the scope of the appended claims.

We claim:

1. A holder of shaker type for condiments and like substances comprising a hollow shaker element having its wall imperforate and including a re-entrant conical wall portion with the smaller end of the cone constituting the outlet and located within the hollow of the shaker element to provide an annular groove around the conical wall portion, said conical wall portion having its ends open and the larger end of its wall portion sealed to the rest of the element structure, and a base member comprising an upwardly extending conical projection of an apex angle the same as said conical wall portion, the larger end of said conical projection having a greater diameter than the larger end of said conical wall portion whereby, when the shaker element is positioned on the conical projection, the body of the shaker element is maintained above the basal plane of said conical projection.

2. A holder of shaker type for condiments and like substances comprising a hollow shaker element of substantially spherical external form and having a re-entrant conical recess in its lower portion and an opening at the upper and smaller end of the recess communicating the interior of the element with the atmosphere to constitute the outlet, the outer spherical wall and the wall of the conical recess being of substantially uniform thickness and imperforate, and a base member comprising an upwardly extending conical structure for engaging the wall of said conical recess for supporting the element and for sealing said opening.

HENRY C. THOMPSON.
ANGELO DE STEFANO.